J. C. CRAWFORD.
Harvesters.
No. 147,242.
Patented Feb. 10, 1874.
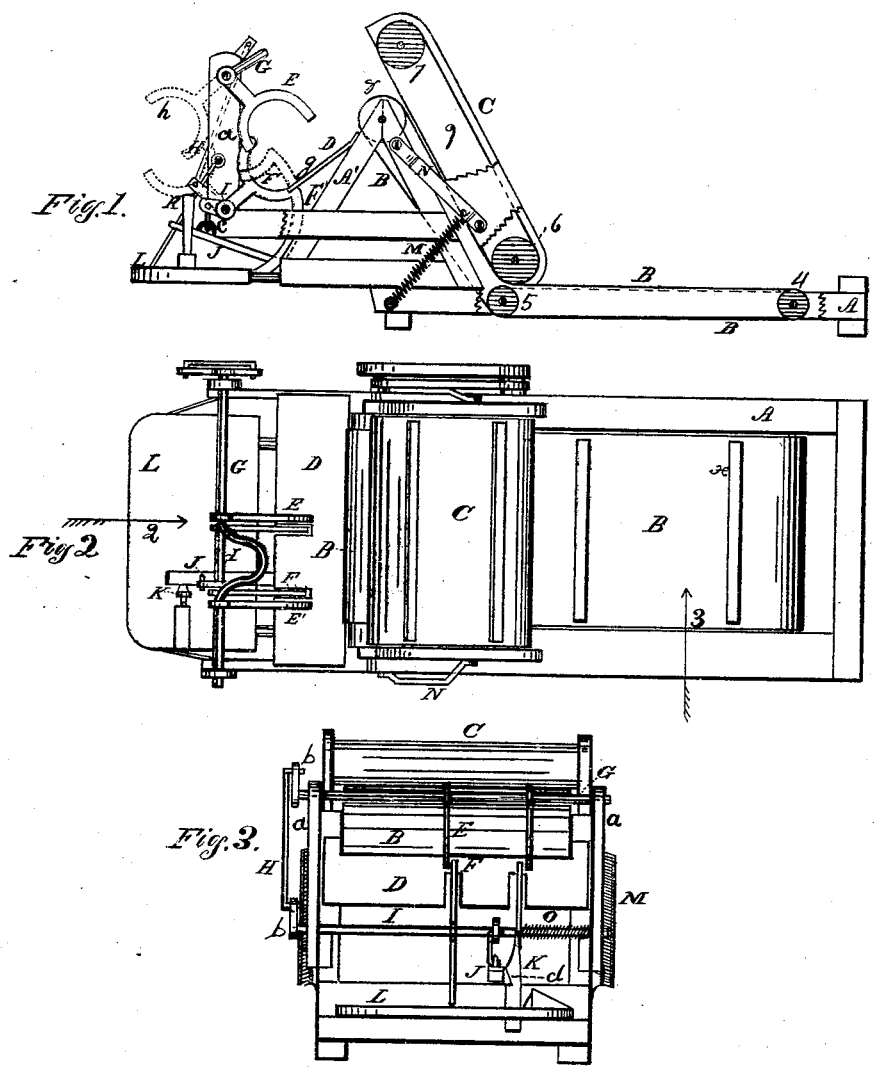

UNITED STATES PATENT OFFICE

JOHN C. CRAWFORD, OF FAYETTE, IOWA.

IMPROVEMENT IN HARVESTERS.

Specification forming part of Letters Patent No. 147,242, dated February 10, 1874; application filed November 17, 1873.

*To all whom it may concern:*

Be it known that I, JOHN C. CRAWFORD, of Fayette, in the county of Fayette and State of Iowa, have invented an Improvement in Harvesters, of which the following is a specification:

The nature of the present invention consists, first, in the novel construction of a carrying-belt, it being so arranged that a portion of it lies flat, or nearly so, on the platform, and then extends upward and over a roller elevated at such height that a binder may handle the delivered grain. In front of the inclined part of the said belt is placed an endless belt, which, by means of suitable rollers and a frame-work, is arranged to run simultaneously with the first-mentioned belt, and elevate the grain between them, and deliver it to the binder-rack. The frame of the front belt is arranged to be adjusted relatively to the under belt by means of connecting-rods and springs, so that more or less grain may pass up without disturbing the operative functions of the parts. Second, in the novel construction of a binder-rack, which is provided with pivoted arms, to receive the grain as it is delivered from the carrying-belts, and is so operated upon by a foot-lever as to close the arms at the time they are full, and clamp the bundle for binding. The arms, as soon as the bundle is bound, are brought back to open in the rear to discharge it, the lower arms of the binder-rack being curved downward to support the grain during the delivery of the bundle.

In the drawing, Figure 1 is a longitudinal elevation of my improvement in harvesters; Fig. 2, a plan or top view thereof; Fig. 3, a view of Fig. 2, looking in the direction of dart 2.

A may represent the platform-frame of a harvester, on which the grain from the sickle falls in the direction of dart 3, the platform moving in the opposite direction, indicated by the dart. B B represent an endless carrying-belt, which passes over roller 4, under rollers 5 6, and over roller 8, the latter roller being supported by a truss-frame, A', having a support on the frame A of the platform. To this truss-frame A' is connected, by two rods, N, a frame, 9, carrying an endless belt, C, which is drawn with suitable force toward the inclined part of the lower belt, by springs M, to elevate any grain passing between the belts. The binder-rack consists of two sets of semicircular arms, E F, the upper set being rigidly fastened to a horizontal rod, G, and the lower set to a horizontal rod, I, having bearings in two upright frame-pieces, *a*. These rods are coupled together by a connecting-rod, H, and cranks *b*, so as to move simultaneously, when a treadle, J, turns the lower rod I. This treadle is pivoted to the platform, and connected by a rod or link and lever, *c*, Fig. 1, and operates against a spring-standard, K, which is provided with a notch, *d*, Fig. 3, to act as a guide for bringing the lever J down to a point, to cause the arms E F to grasp a bundle. The lower set of arms F are provided with downwardly-curved ends F', which, when the bundle is being discharged at the rear, are elevated, as shown by dotted lines *g*.

The operation is as follows: As the harvester moves along, the grain, falling on the endless belt B, is carried to the binder-rack by passing between the belts and falling into the arms E F, in position, as at Fig. 1. The lever J is then brought down by the foot to notch *d* on standard K. This will bring the forward points of the arms E F together, and compress a bundle in them, after which the bundle is bound by hand, and the lever J brought down to the rear L of the platform. This movement will bring the arms E F to the rear, as shown by dotted lines *h*, and allow the bundle to be discharged. The lever J is then released, and the arms will be thrown back to the position shown in Fig. 1 by means of a coil-spring, O, on the rod I, or other suitable means.

The means for forming a connection between the belts and binding-rack consists of a plate, D, one edge of which fits closely to the under belt B, and the other edge projects somewhat past the arms E F, and is provided with notches, which allow the arms to have a free motion.

This plate is an important feature, and, in combination with the elongated arms F', prevents the grain from falling through or getting tangled.

I claim—

1. The lower endless belt B, part inclined and part lying level, in combination with the front belt C and its adjustable frame 9, with connecting-rods N and springs M, for delivering grain to the binder-rack, as set forth.

2. The binder-rack, consisting of the rods G I, arms E F, elongated parts F', treadle J, guide-standards K, and spring O, as specified.

JOHN C. CRAWFORD.

Witnesses:
J. H. ELLIOTT,
G. L. CHAPIN.